United States Patent
Geng et al.

(10) Patent No.: US 12,307,322 B1
(45) Date of Patent: May 20, 2025

(54) BARCODE READING DEVICE

(71) Applicant: Delta Electronics, Inc., Taoyuan (TW)

(72) Inventors: Jing Geng, Taoyuan (TW); Yu-Yun Hsu, Taoyuan (TW); Yi-Hsuan Lee, Taoyuan (TW); Po-Lin Chou, Taoyuan (TW); Bo Ma, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/588,480

(22) Filed: Feb. 27, 2024

(30) Foreign Application Priority Data

Jan. 18, 2024 (CN) .......................... 202410075701.5

(51) Int. Cl.
*G06K 7/10* (2006.01)
*G06K 7/14* (2006.01)

(52) U.S. Cl.
CPC ....... *G06K 7/10712* (2013.01); *G06K 7/1413* (2013.01)

(58) Field of Classification Search
CPC .......................... G06K 7/10712; G06K 7/1413
See application file for complete search history.

(56) References Cited

U.S. PATENT DOCUMENTS

| | | | | |
|---|---|---|---|---|
| 7,344,080 B2 * | 3/2008 | Vinogradov | ............. | G06K 7/14 235/462.43 |
| 11,562,162 B1 * | 1/2023 | Handshaw | ......... | G06K 7/10831 |
| 2015/0021400 A1 * | 1/2015 | Lei | ........ | G06K 7/1404 235/462.01 |
| 2017/0255804 A1 * | 9/2017 | Orati | .................. | G06K 7/10564 |
| 2019/0057232 A1 * | 2/2019 | Ren | ..................... | G06K 7/10732 |
| 2019/0302068 A1 * | 10/2019 | Tolley | .................... | G01N 35/02 |
| 2021/0150163 A1 * | 5/2021 | Gurevich | ............. | G06K 7/1413 |
| 2023/0034494 A1 * | 2/2023 | Fernandez-Dorado | | G01N 21/8806 |
| 2024/0302718 A1 * | 9/2024 | Fernández Dorado et al. | ............ | G06K 7/10752 |

FOREIGN PATENT DOCUMENTS

EP            1017006 A2 *   7/2000   ......... G06K 7/10653

* cited by examiner

*Primary Examiner* — Tuyen K Vo
(74) *Attorney, Agent, or Firm* — KIRTON McCONKIE; Evan R. Witt

(57) ABSTRACT

A barcode reading device includes a housing, a first modularized assembly and a second modularized assembly. The housing has a window for placing a barcode. The first modularized assembly is disposed in the housing and includes a first light source, a second light source, and a first frame for disposing and positioning the first light source and the second light source. The second modularized assembly is disposed in the housing and includes a reflective optical element, an imaging unit, and a second frame for disposing and positioning the reflective optical element and the imaging unit. Positions of the first light source, the second light source, the reflective optical element and the imaging unit relative to the window are defined by positioning the first frame and the second frame in the housing.

13 Claims, 12 Drawing Sheets

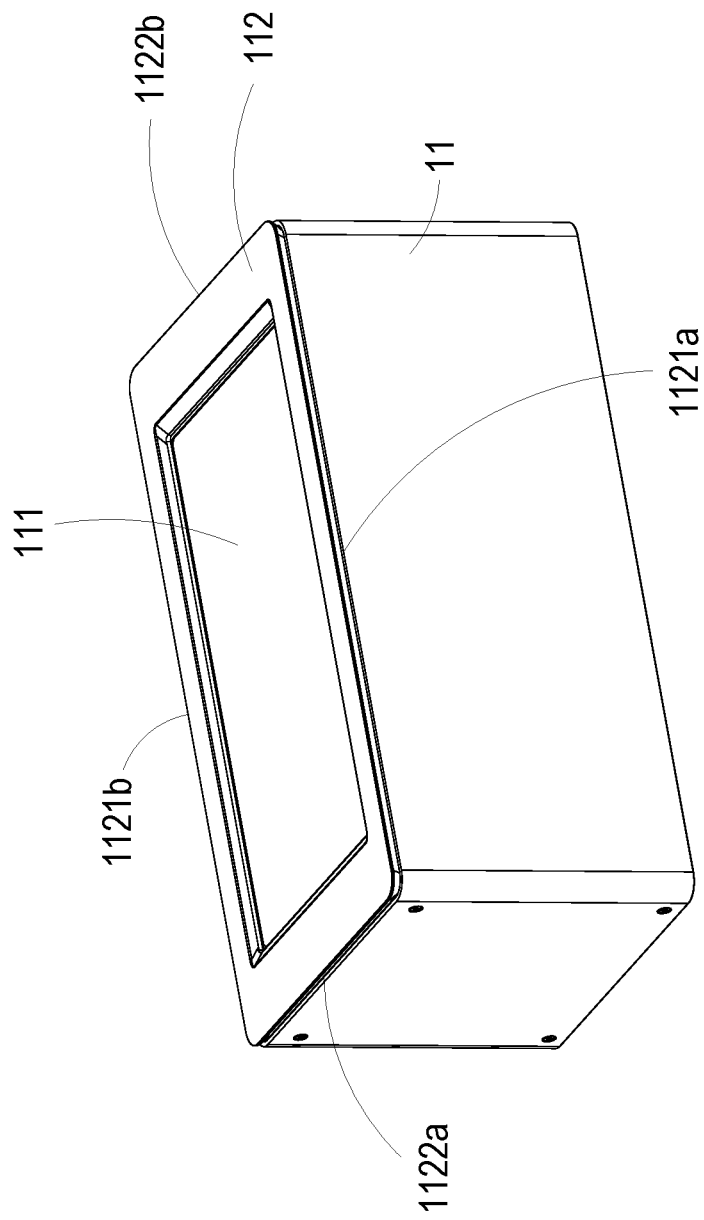

BARCODE READING DEVICE

CROSS-REFERENCE TO RELATED APPLICATION

This application claims priority to China Patent Application No. 202410075701.5 filed on Jan. 18, 2024. The entireties of the above-mentioned patent application are incorporated herein by reference for all purposes.

FIELD OF THE INVENTION

The present disclosure relates to a barcode reading device, and more particularly to a barcode reading device that can be assembled correctly in a fast manner.

BACKGROUND OF THE INVENTION

Barcode reading devices are usually used during processing biological samples for reading barcodes on sampling tubes.

Advantageously, the barcode reading device can read several barcodes located at bottoms of the sampling tubes, which are positioned in a tube rack, at the same time, thereby helping to input a great amount of sample information in a short time.

Generally, the barcode reading device includes a window for placing the tube rack with sampling tubes, so barcodes located at the bottoms of sampling tubes can be optically imaged and then identified for achieving the input of sample information.

In order to capture clear images of barcodes, the arrangement of optical elements and the design of light path inside the barcode reading device are critical, and how to quickly and correctly complete the positioning and assembling of optical elements is especially important in the manufacturing process.

Therefore, there is a need of providing a barcode reading device for meeting the requirements above.

SUMMARY OF THE INVENTION

An object of the present disclosure is to provide a barcode reading device with improved assembling efficiency and accuracy.

An additional object of the present disclosure is to provide a barcode reading device which achieves the consistent assembling procedure and reduces the influence of manual operation through modularizing core reading elements thereof.

In accordance with an aspect of the present disclosure, a barcode reading device is provided. The barcode reading device includes a housing, a first modularized assembly and a second modularized assembly. The housing has a window for placing a barcode. The first modularized assembly is disposed in the housing and includes at least one first light source for illuminating the barcode, at least one second light source for illuminating the barcode, and a first frame for disposing and positioning the at least one first light source and the at least one second light source. The second modularized assembly is disposed in the housing and includes at least one reflective optical element for reflecting a light from the barcode, at least one imaging unit for receiving an image of the barcode reflected by the at least one reflective optical element, and a second frame for disposing and positioning the at least one reflective optical element and the at least one imaging unit. Positions of the at least one first light source, the at least one second light source, the at least one reflective optical element and the at least one imaging unit relative to the window are defined by positioning the first frame and the second frame in the housing.

In an embodiment, the window is disposed on a top plate of the housing, the window, the first frame and the second frame are arranged in sequence from top to bottom, and the first frame and the second frame are mutually combined and positioned in the housing.

In an embodiment, the first frame includes at least one first disposing portion and at least one second disposing portion for respectively disposing the at least one first light source and the at least one second light source.

In an embodiment, the first frame includes a plurality of adjustment members disposed on the at least one first disposing portion and/or the at least one second disposing portion for adjusting a position of the at least one first light source and/or the at least one second light source.

In an embodiment, the plurality of adjustment members include at least one slot, and the at least one first light source and/or the at least one second light source is moved along a longitudinal direction of the at least one slot.

In an embodiment, the second frame includes at least one third disposing portion and at least one fourth disposing portion for respectively disposing the at least one reflective optical element and the at least one imaging unit.

In an embodiment, the second frame includes a plurality of positioning elements disposed on the at least one third disposing portion for positioning the at least one reflective optical element.

In an embodiment, the barcode reading device further includes at least one installation plate for disposing the at least one imaging unit, and a plurality of supporting elements, a plurality of fastening elements and a plurality of elastic elements for disposing the at least one installation plate on the at least one fourth disposing portion of the second frame, and for adjusting a positional relationship between the at least one installation plate and the at least one fourth disposing portion, thereby adjusting a pitch angle and/or a focal length of the at least one imaging unit.

In an embodiment, the barcode reading device further includes a light shielding member disposed on the window for regulating a range of the window to dispose the barcode.

In an embodiment, the window is disposed on a top plate of the housing, and the top plate includes a first set of opposite sides and a second set of opposite sides, wherein a length of the first set of opposite sides is greater than a length of the second set of opposite sides.

In an embodiment, the at least one first light source includes two first LED arrays disposed respectively corresponding to the first set of opposite sides, and an optical surface of each of the two first LED arrays is faced toward the window and at an angle of 90 degree relative to a plane of the window.

In an embodiment, the at least one second light source includes two second LED arrays disposed respectively corresponding to the second set of opposite sides, and an optical surface of each of the two second LED arrays is faced toward the window and at an angle of 45 degree relative to a plane of the window.

In an embodiment, the at least one first light source and the at least one second light source respectively have an angular distribution of 120 degree.

In an embodiment, the at least one reflective optical element includes two reflective mirrors disposed under the window and arranged adjacent to each other in a direction along the length of the first set of opposite sides, and a reflecting surface of each of the two reflective mirrors is respectively faced toward one of the second set of opposite sides adjacent thereto and at an acute angle relative to a plane of the window, and wherein the at least one imaging unit includes two cameras respectively disposed between one of the two reflective mirrors and one of the second set of opposite sides adjacent to said one of the two reflective mirrors and facing toward the reflecting surface of said one of the two reflective mirrors.

In an embodiment, a section of the second frame along an arranging direction of the at least one reflective optical element and the at least one imaging unit has a W-liked shape.

BRIEF DESCRIPTION OF THE DRAWINGS

The above contents of the present disclosure will become more readily apparent to those ordinarily skilled in the art after reviewing the following detailed description and accompanying drawings, in which:

FIG. 1A is a schematic view illustrating a barcode reading device according to an embodiment of the present disclosure;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1B:
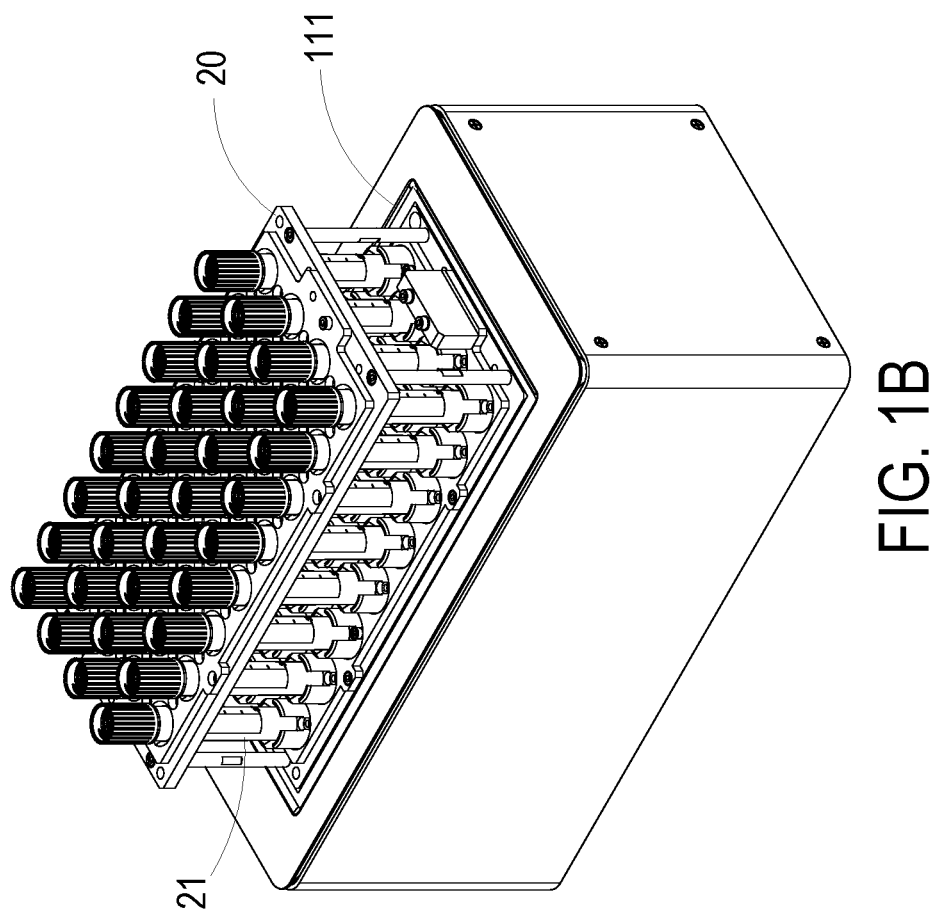
FIG. 1B is a schematic view illustrating the barcode reading device having a tube rack with sampling tubes placed thereon according to the embodiment of the present disclosure.

Please refer to FIG. 1A and FIG. 1B. FIG. 1A is a schematic view illustrating a barcode reading device according to an embodiment of the present disclosure, and FIG. 1B is a schematic view illustrating the barcode reading device having a tube rack with sampling tubes placed thereon according to the embodiment of the present disclosure. A barcode reading device 10 includes a housing 11 having a top plate 112 for disposing a window 111, and the window 111 is used for placing a tube rack 20 thereon, wherein the tube rack 20 accommodates several sampling tubes 21, and each of the sampling tubes 21 has a barcode (not shown) disposed at a bottom thereof. The barcode reading device 10 reads the barcodes on the sample tubes 21 via the window 111. In the embodiment, the window 111 is a light-transmitting region, and the other portions of the housing 11 are opaque for preventing external lights and internal reflected lights from affecting barcode reading.

In some embodiments, the housing 11 is implemented as a rectangular prism, wherein the top plate 112 for disposing the window 111 has a first set of opposite sides 1121a, 1121b and a second set of opposite sides 1122a, 1122b, and a length of the first set of opposite sides 1121a, 1121b is greater than a length of the second set of opposite sides 1122a, 1122b. In other embodiments, the housing 11 is implemented to have a different shape in accordance with practical requirements without limitation.

Figure 2A:
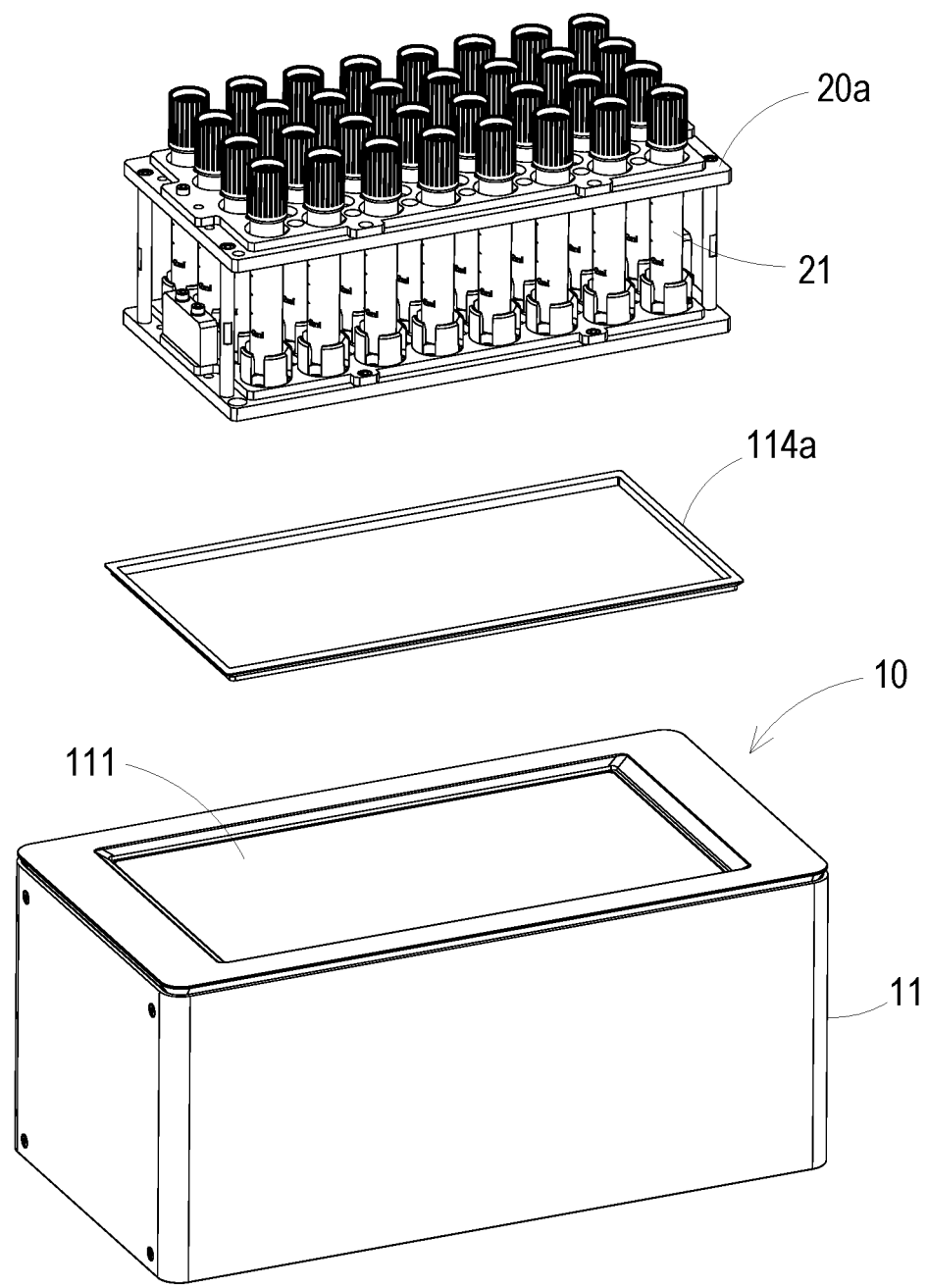
FIGS. 2A-2B are schematic views illustrating the barcode reading devices cooperating with different light shielding members according to embodiments of the present disclosure.
Figure 2B:
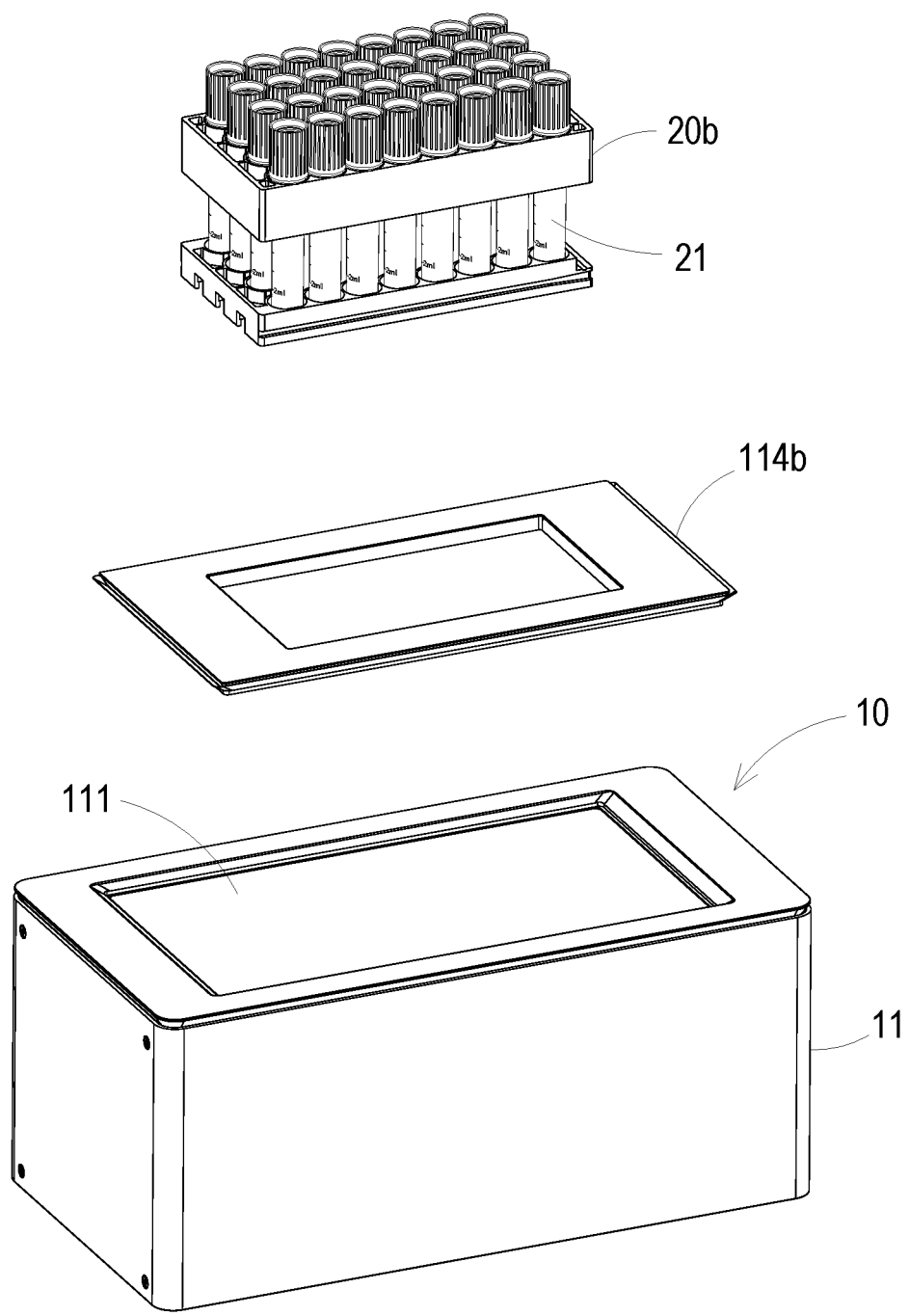

The window 111 is a region on the top of the housing 10 which provides uniform illumination for correctly reading barcodes, so there is no limitation to the shape of the window 111. For example, the window 111 can be rectangular shape, square shape or other shapes, and alternatively, the shape of the window 111 also can be designed to match to the tube rack. Moreover, for broadening the application of the barcode reading device 10, a light shielding member is provided. For example, as shown in FIGS. 2A-2B, by cooperating with different kinds of light shielding members 114a or 114b, an exposed region of the window 111 can be changed to adapt to tube racks 20a or 20b in different sizes. In other words, by simply changing the light shielding member, one barcode reading device can meet the requirements for placing various sizes of tube racks, which effectively increases the scope of applicability. Here, the light shielding members 114a, 114b, like the housing 11, also are opaque, so the illumination region for reading the barcodes can be effectively regulated and the influence of external lights and internal reflected lights on barcode reading also can be avoided.

Figure 3:
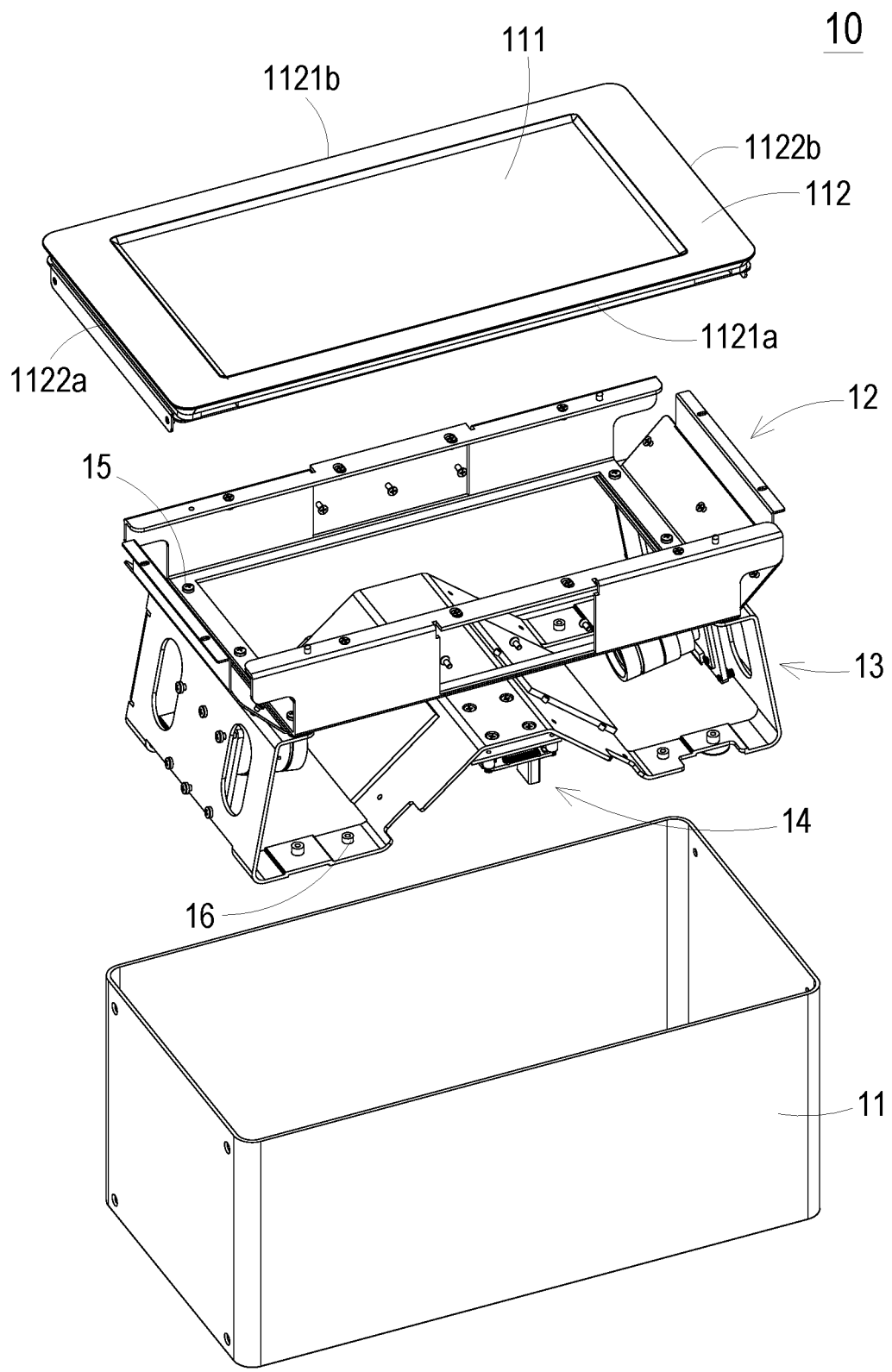
FIG. 3 is a schematic exploded view illustrating the barcode reading device according to the embodiment of the present disclosure.
Figure 4:
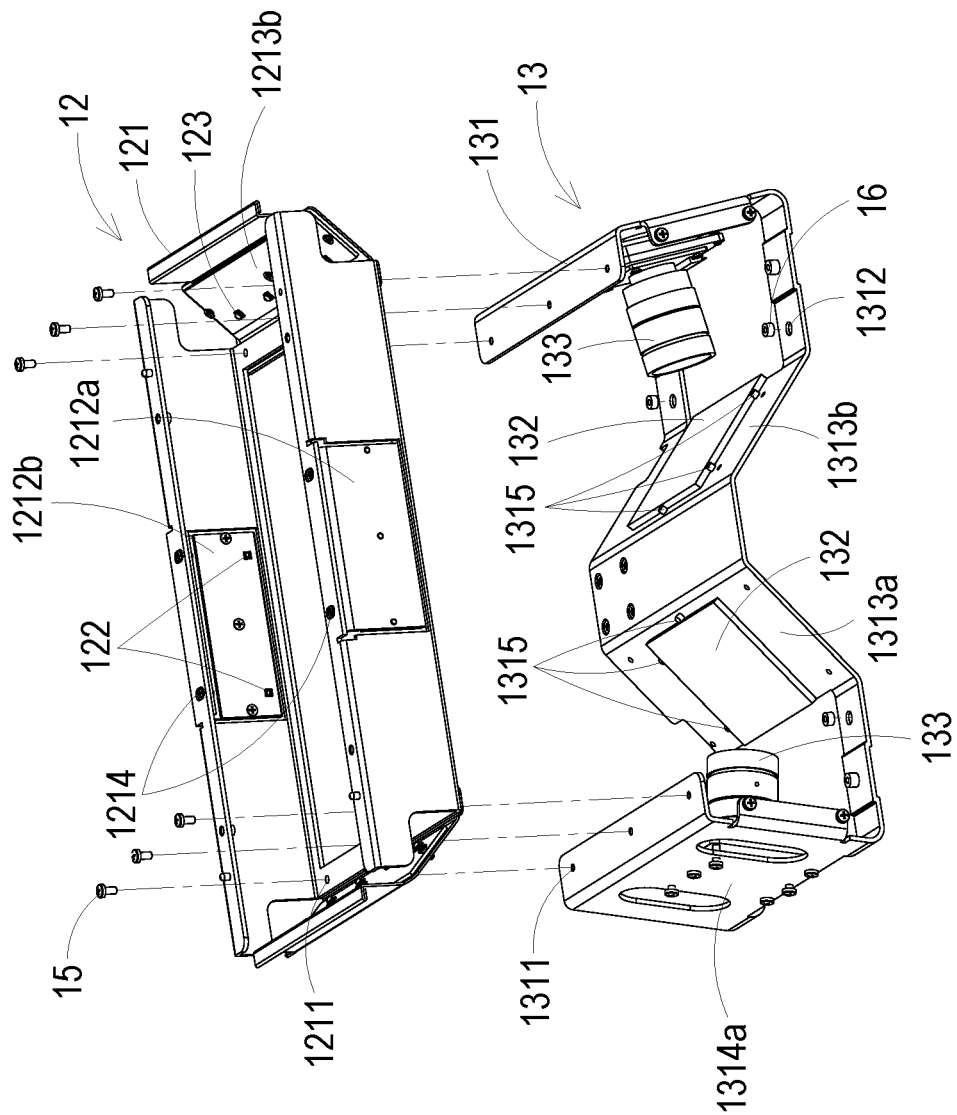
FIG. 4 is a schematic view illustrating a first modularized assembly and a second modularized assembly of the barcode reading device.
Figure 5A:
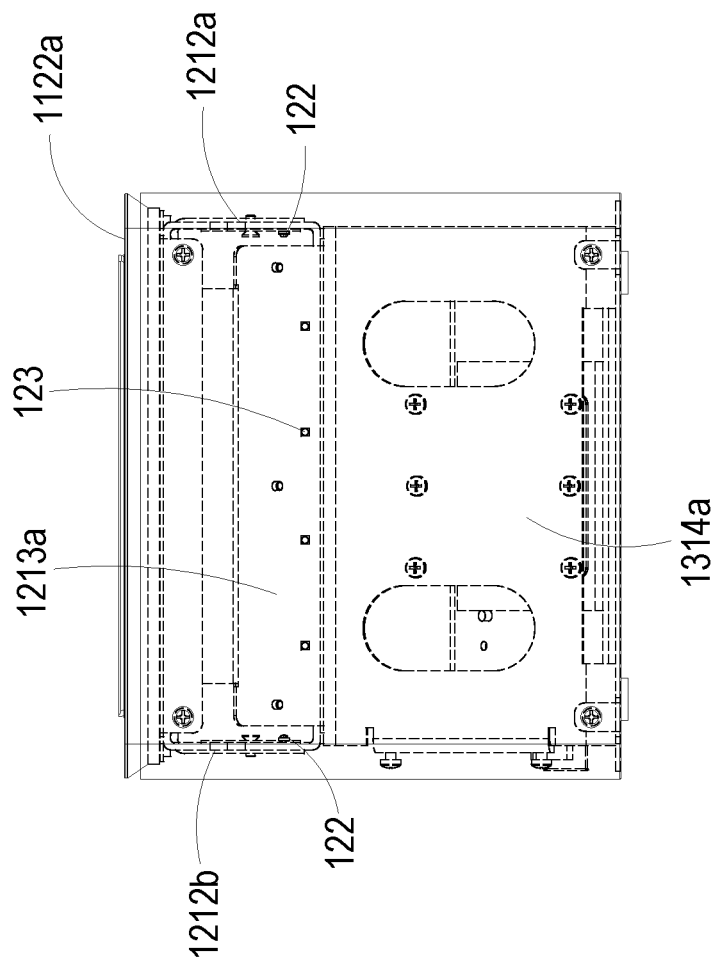
FIG. 5A is a schematic perspective view from one of a second set of opposite sides of the barcode reading device.
Figure 5B:
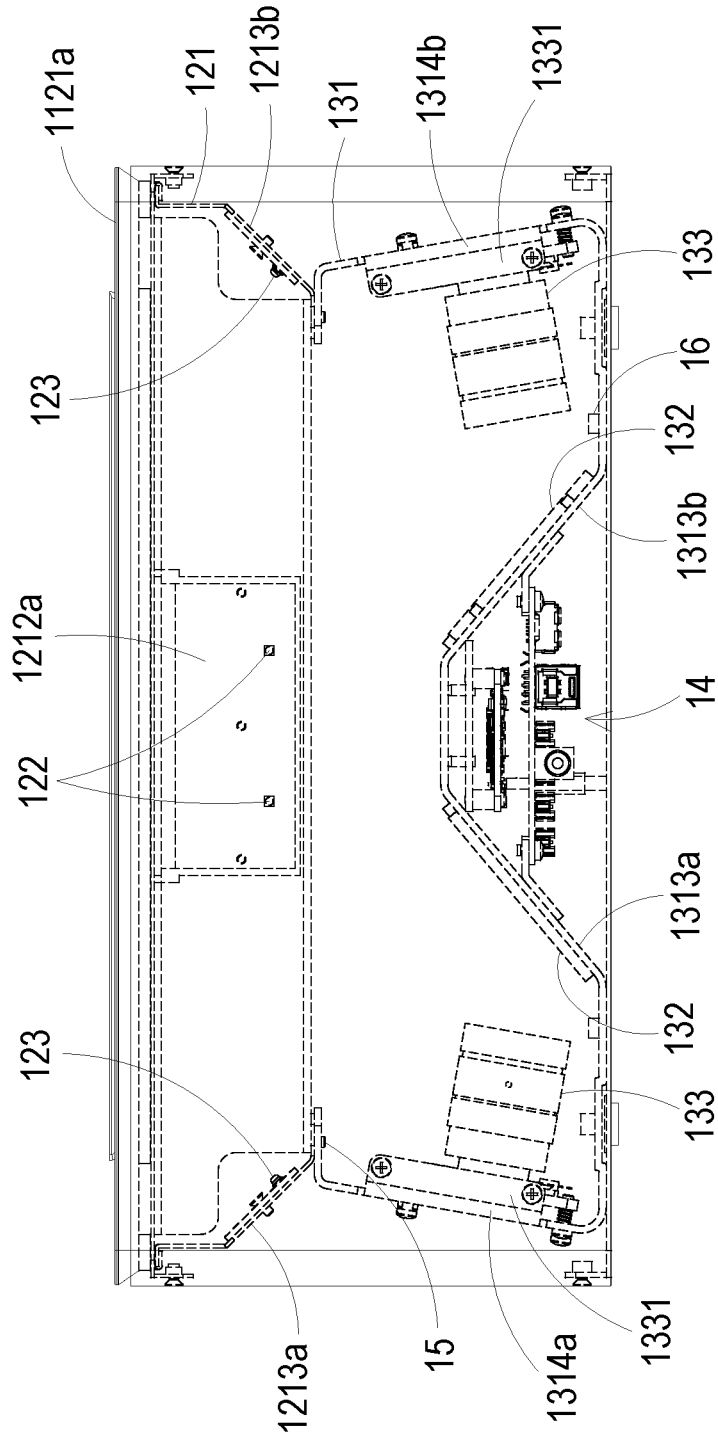
FIG. 5B is a schematic perspective view from one of a first set of opposite sides of the barcode reading device.
Figure 6:
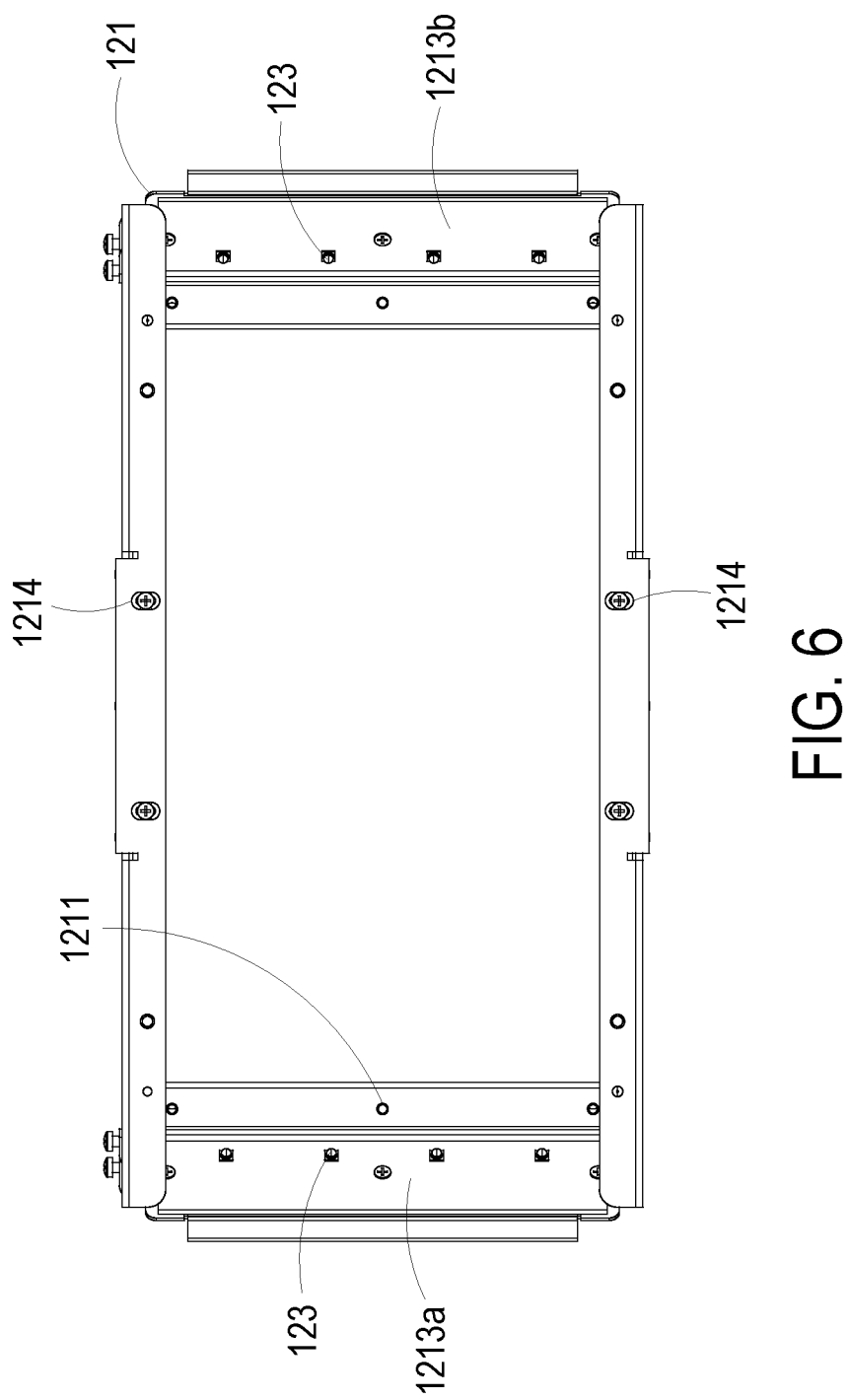
FIG. 6 is a top view illustrating the first modularized assembly of the barcode reading device.
Figure 7:
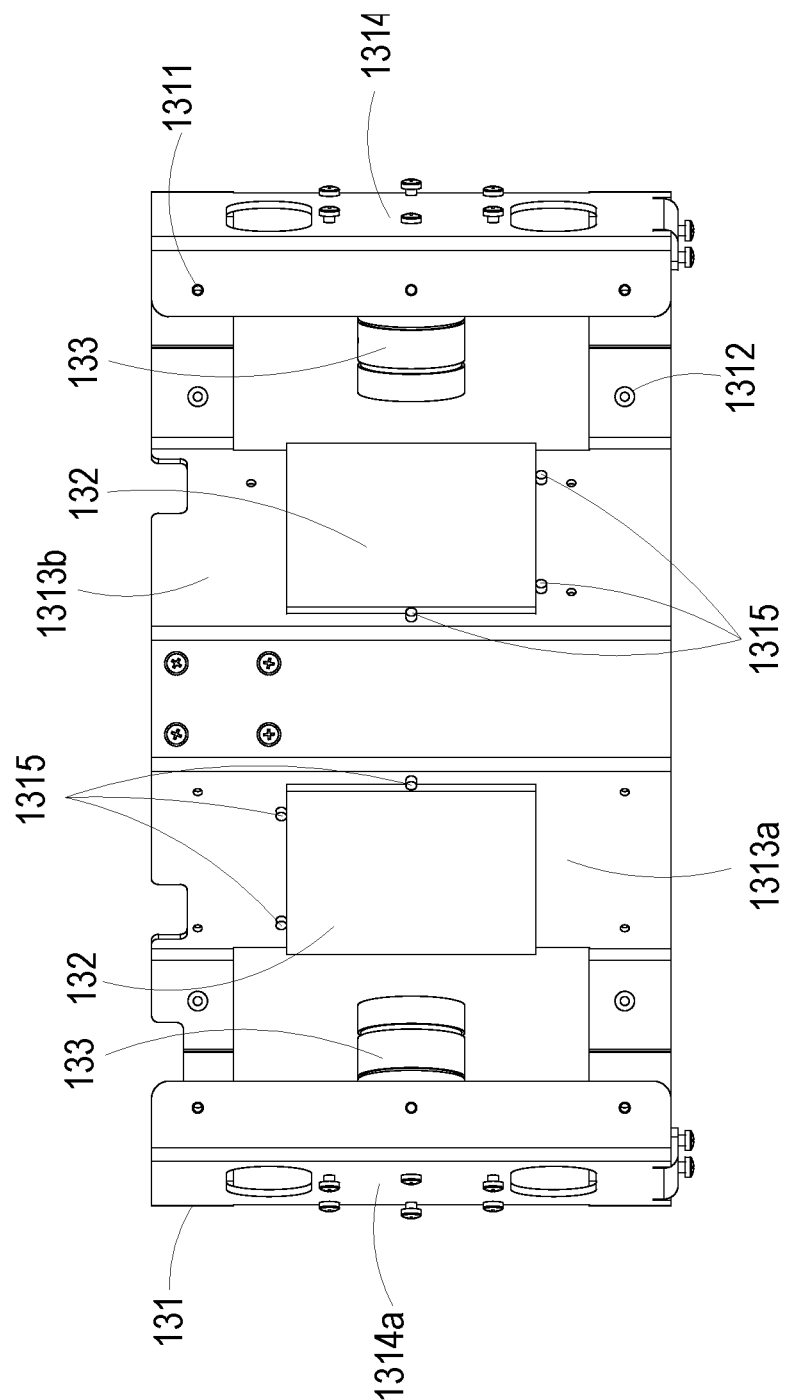
FIG. 7 is a top view illustrating the second modularized assembly of the barcode reading device.

Please refer to FIG. 3, FIG. 4, FIGS. 5A-5B, FIG. 6 and FIG. 7. FIG. 3 is a schematic exploded view illustrating the barcode reading device according to the embodiment of the present disclosure. FIG. 4 is a schematic view illustrating a first modularized assembly and a second modularized assembly of the barcode reading device. FIG. 5A is a schematic perspective view from one of the second set of opposite sides of the barcode reading device. FIG. 5B is a schematic perspective view from one of the first set of opposite sides of the barcode reading device. FIG. 6 is a top view illustrating the first modularized assembly of the barcode reading device. FIG. 7 is a top view illustrating the second modularized assembly of the barcode reading device. The barcode reading device 10 includes the housing 11, a first modularized assembly 12, a second modularized assembly 13 and a control module 14. The first modularized assembly 12 includes a first frame 121, at least one first light source 122 and at least one second light source 123. The second modularized assembly 13 includes a second frame 131, at least one reflective optical element 132 and at least one imaging unit 133. That is, in the present disclosure, core reading elements of the barcode reading device 10 are divided into two parts, one is the first modularized assembly 12 for providing function of barcode illumination, and the other is the second modularized assembly 13 for providing function of barcode imaging.

The firs modularized assembly 12 and the second modularized assembly 13 are mutually combined in a top-and-bottom manner and disposed in the housing 11, so that the window 111, the first modularized assembly 12 and the second modularized assembly 13 are arranged in sequence from top to bottom. The control module 14 is disposed under the second modularized assembly 13. In the embodiment, the first frame 121 includes first combining portions 1211, the second frame 131 includes second combining portions 1311, and combining elements 15 are utilized to respectively penetrate the first combining portions 1211 and the second combining portions 1311 for combining the first frame 121 and the second frame 1311 together. For example, the first frame 121 and the second frame 131 are respectively implemented as a metal frame, the first combining portions 1211 and the second combining portions 1311 are respectively implemented as combining holes, and the combining elements 15 which are implemented as screws can penetrate therethrough for combination. Moreover, the second frame 131 further includes fixing portions 1312 for being fixed to the housing 11 through fixing elements 16, which therefore positions the first modularized assembly 12 and the second modularized assembly 13 in the housing 11, and also defines positions of the first modularized assembly 12 and the second modularized assembly 13 relative to the window 111.

The first modularized assembly 121 includes first disposing portions 1212a, 1212b and second disposing portions 1213a, 1213b, wherein the first disposing portions 1212a, 1212b are used for disposing the first light sources 122, and the second disposing portions 1213a, 1213b are used for disposing the second light sources 123, thereby defining positions of the first light sources 122 and the second light sources 123 in the housing 11, positional relationship among the first light sources 122 and the second light sources 123, and positions of the first light sources 122 and the second light sources 123 relative to the window 111, and achieving the illumination uniformity of the window 111. The first disposing portions 1212a, 1212b are located at positions approximately at centers of the first set of opposite sides 1121a, 1121b as the first frame 121 is disposed in the housing 11, and the second disposing portions 1213a, 1213b are located at positions corresponding to and approximately parallel to the second set of opposite sides 1122a, 1122b as the first frame 121 is disposed in the housing 11.

In an embodiment, the first light sources 122 include two first LED arrays, e.g., each LED array is in a long strip shape with two LEDs, and the two first LED arrays are respectively disposed on the opposite first disposing portions 1212a, 1212b, wherein the optical surface of each of the two first LED arrays is faced toward the window 111 and at an angle of θ1 relative to the plane of the window 111. In a preferred embodiment, θ1 is 90 degree, namely, the optical surfaces of the two first LED arrays are parallel to each other. In an embodiment, the second light sources 123 include two second LED arrays, e.g., each LED array is in a long strip shape with four LEDs, and the two second LED arrays are respectively disposed on the opposite second disposing portions 1213a, 1213b, wherein the optical surface of each of the two second LED arrays is faced toward the window 111 and at an angle of θ2 relative to the plane of the window 111. In a preferred embodiment, θ2 is 45 degree, namely, the optical surfaces of the two second LED arrays form an angle of 90 degree. Moreover, the first light sources 122 and the second light sources 123 respectively have an angular distribution of 120 degree. Under this configuration, a section of the first frame along the first set of opposite sides 1121a, 1121b has a shape formed by combing an upper rectangle with a lower inverted trapezoid.

In a preferred embodiment, the first disposing portions 1212a, 1212b further include adjustment members 1214 for fine-adjusting the disposing positions of the first light sources 122. For example, the adjustment members 1214 are implemented as slots, and a longitudinal direction of each of the slots is perpendicular to the optical surfaces of the first light sources 122, namely, perpendicular to the first set of opposite sides 1121a, 1121b, so the first light sources 122 which are fixed on the first disposing portions 1212a, 1212b can have minor movements along the slots for fine-adjusting the distance therebetween, thereby adjusting the illumination uniformity of the window 111. Similarly, the second disposing portions 1213a, 1213b also can have similar adjustment members (not shown), and the descriptions are omitted due to the similar construction thereof.

In view of the descriptions above, the first disposing portions 1212a, 1212b and the second disposing portions 1213a, 1213b of the first frame 121 define not only the positions of the first light sources 122 and the second light sources 123 relative to the window 111, but also the angles of the respective optical surfaces thereof relative to the window 111. Hence, it only needs to design the structure of the first frame 121 to regulate the first disposing portions 1212a, 1212b and the second disposing portions 1213a, 1213b to meet the practical requirements, the positioning of the first light sources 122 and the second light sources 123 can be completed accurately in a fast manner. This is extremely beneficial for achieving the consistency and accuracy of assembling, simplifying and quickly completing the assembling, and accelerating the post-assembly adjustment, which saves a lot of assembling time and significantly improves the assembling efficiency and accuracy.

More specifically, in the present disclosure, by employing the first frame 121, positional relationships among the light sources and positions of the light sources in the housing can be accurately positioned in a fast manner during assembling. That is, a modularized assembling manner is employed in the present disclosure to replace the conventional separated assembling operations. Accordingly, the structure of the first frame 121 can be varied to meet the number and the arrangement of light sources for achieving the required illumination uniformity in practical, for example, the structure can be varied in accordance with the length of the first set of opposite sides and/or the type of light source used, without limitation.

The second frame 131 includes third disposing portions 1313a, 1313b and fourth disposing portions 1314a, 1314b. The third disposing portions 1313a, 1313b are used for disposing the reflective optical elements 132, and the fourth disposing portions 1314a, 1314b are used for disposing the imaging units 133, thereby defining positions of the reflective optical elements 132 and the imaging units 133 in the housing 11. The third disposing portions 1313a, 1313b are located at positions under the window 111 as the second frame 131 is disposed in the housing 11, and the fourth disposing portions 1314a, 1314b are located at positions corresponding to and approximately parallel to the second set of opposite sides 1122a, 1122b as the second frame 131 is disposed in the housing 11.

In an embodiment, the reflective optical elements 132 include two reflective mirrors which are adjacently arranged under the window 111 along a length direction of the first set of opposite sides 1121, 1121b, and the reflecting surface of each of the reflective mirrors is faced toward one of the second set of opposite sides 1122a, 1122b adjacent thereto and is at an acute angle relative to the plane of window 111. That is, as shown in FIG. 5B, the reflective optical element 132 at the left side faces an upper left direction, and the reflective optical element 132 at the right side faces an upper right direction. Moreover, the imaging units 133 include two cameras which are respectively arranged between one of the reflective mirrors and one of the second set of opposite sides 1122a, 1122b adjacent to said one of the reflective mirrors. Also, the two cameras are arranged to respectively face toward one of the two reflective mirrors adjacent thereto and in the reflection path of the adjacent reflective mirror. That is, as shown in FIG. 5B, two imaging units 133 are respectively arranged at two opposites outer sides of the two reflective optical elements 132 and faced toward the two reflective optical elements 132. Accordingly, lights from the light sources and reflected by the barcode travel downward to hit the two reflective mirrors and be reflected to travel toward the two cameras respectively corresponding thereto, thereby achieving the barcode imaging. In the embodiment, two reflective mirrors and two cameras are arranged in the housing 11 in a symmetrical manner, so the height of the barcode reading device can be effectively reduced. Besides, by adopting the arrangement of two cameras, the imaging range can be up to 211 mm×102 mm (+100% area), and the imaging by two cameras also helps to suppress image distortion. In a preferred embodiment, the resolution of the two cameras are 3040×4030 (approximately 12 million pixels) for providing a precise scanning capability to resolve barcodes in smaller sizes, wherein the decoding time is approximately 2 to 3 seconds. Under this configuration, a section of the second frame 131 along the first set of opposite sides 1121a, 1121b has a W-liked shape.

In a preferred embodiment, the third disposing portions 1313a, 1313b further include a plurality of positioning elements 1315 for positioning the reflective optical elements 132 disposed thereon, which helps to further simplify the assembly of the reflective optical elements.

In view of the descriptions above, the third disposing portions 1313a, 1313b and the fourth disposing portions 1314a, 1314a define not only positions of the reflective optical elements 132 relative to the window 111 and the light reflection paths, but also positions of the imaging units 133 in the housing 11 and angles thereof for receiving lights. Hence, it only needs to design the structure of the second frame 131 to regulate the third disposing portions 1313a, 1313b and the fourth disposing portions 1314a, 1314b to meet the practical requirements, the positioning of the reflective optical elements 132 and the imaging units 133 can be completed accurately in a fast manner. This is extremely beneficial for achieving the consistency and accuracy of assembling, simplifying and quickly completing the assembling, and accelerating the post-assembly adjustment, which saves a lot of assembling time and significantly improves the assembling efficiency and accuracy.

More specifically, in the present disclosure, by employing the second frame 131, positions of the reflective optical elements relative to the window and positional relationships among the reflective optical elements and the imaging units can be positioned accurately in a fast manner during assembling. That is, a modularized assembling manner is employed in the present disclosure to replace the conventional separated assembling operations. Accordingly, the structure of the second frame 131 can be varied to meet the number and angles of the reflective optical elements and the number of the imaging units corresponding thereto in practical, without limitation.

In summary, in the present disclosure, the core reading elements of the barcode reading device 10 are divided into the first modularized assembly 12 and the second modularized assembly 13, and the structures of the first frame 121 and the second frame 131 are designed to define the angles and positions of all required elements, so it only needs to respectively place the elements on the corresponding disposing portions of the first frame 121 and the second frame 131, the assembling of the first modularized assembly 12 and the second modularized assembly 13 can be completed easily in a fast manner, and then, by combining and positioning the first frame 121 and the second frame 131 in the housing 11, the positioning of all elements relative to the window 111 can be completed instantly, thereby finishing the assembling of the barcode reading device 10. Therefore, while saving the assembling time, the consistency, accuracy and efficiency of assembling also can be significantly improved, which highly ensures the correctness of positions among elements and minimizes the impact of manual operation.

Figure 8:
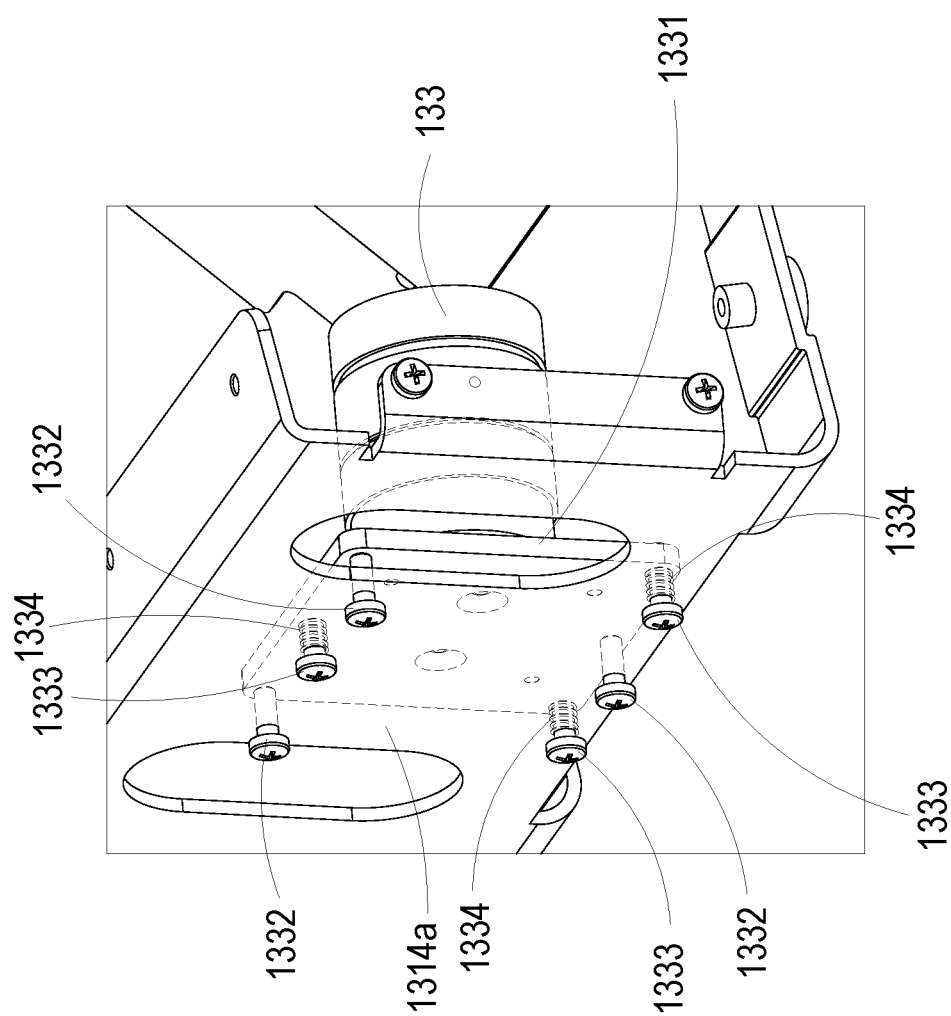
FIG. 8 is an enlarged schematic view illustrating a fourth disposing portion of a second frame and an imaging unit of the barcode reading device.

The present disclosure further provides a mechanism for rapidly and effectively adjusting the pitch angle and the focal length of the imaging unit. Please refer to FIG. 8 which is an enlarged schematic view illustrating a fourth disposing portion of the second frame and the imaging unit. Notably, due to the symmetrical arrangements of the fourth disposing portions 1314a, 1314b and the imaging units 133 in the housing 11, only the fourth disposing portion 1314a and the imaging unit 133 at one side are described below in accordance with FIG. 8 for simplification. In the embodiment, the imaging unit 133 is installed on an installation plate 1331 first and then disposed on the fourth disposing portion 1314a. The fourth disposing portion 1314a and the installation pate 1331 are fixed by a plurality of supporting elements 1332 and a plurality of fastening elements 1333, and the supporting elements 1332 and the fastening elements 1333 are arranged in an alternate manner. For example, as shown in FIG. 8, one fastening element 1333 is disposed between two upper supporting elements 1332, and one supporting element 1332 is disposed between two lower fastening elements 1333. Moreover, one terminal of each of the supporting elements 1332 is inserted in the fourth disposing portion 1314a, and the other terminal thereof is rejected against the installation pate 1331, so that, by moving the supporting element 1332, a portion of the installation plate 1331 supported by said supporting element 1332 can be moved. For example, if the supporting element 1332 at the upper left corner in FIG. 8 is moved, the upper left portion of the installation plate 1331 is therefore moved thereby. In a preferred embodiment, each of the supporting elements 1332 is implemented as a screw, so that, by screwing clockwise or counterclockwise, the supported portion of the installation plate 1331 is moved away from or close to the fourth disposing portion 1314a to achieve the adjustment. On the other hand, two terminals of each of the fastening elements 1333 are respectively disposed on the fourth disposing portion 1314a and the installation plate 1331, and each of the fastening elements 1333 has an elastic element 1334 disposed thereon and sandwiched between the fourth disposing portion 1314a and the installation plate 1331. Under this configuration, through a reaction force of the elastic element 1334, the stabilization of the installation plate 1331 can be achieved. In a preferred embodiment, the fastening element 1333 is implemented as a bolt in which one terminal is rejected on and penetrating the fourth disposing portion 1314a, and the other terminal is fastened on the installation plate 1331, and the elastic member 1334 is implemented as a spring sleeved on the bolt, so that a compression amount of the spring between the fourth disposing portion 1314a and the installation plate 1331 can be adjusted by screwing the bolt, thereby achieving a tightening and stabilizing effect. Accordingly, through alternately arranging the supporting elements 1332 and the fastening elements 1333 cooperating with the elastic elements 1334 mounted on the fastening elements 1333, it is able to alter the angle of the installation plate 1331 three-dimensionally, thereby adjusting the pitch angle and the focal length of the imaging unit 133 installed thereon to ensure a best imaging effect. This adjustment mechanism not only is simple in structure, but also directly utilizes the frame 131, which is cost effective and an advantageous design.

Figure 9:
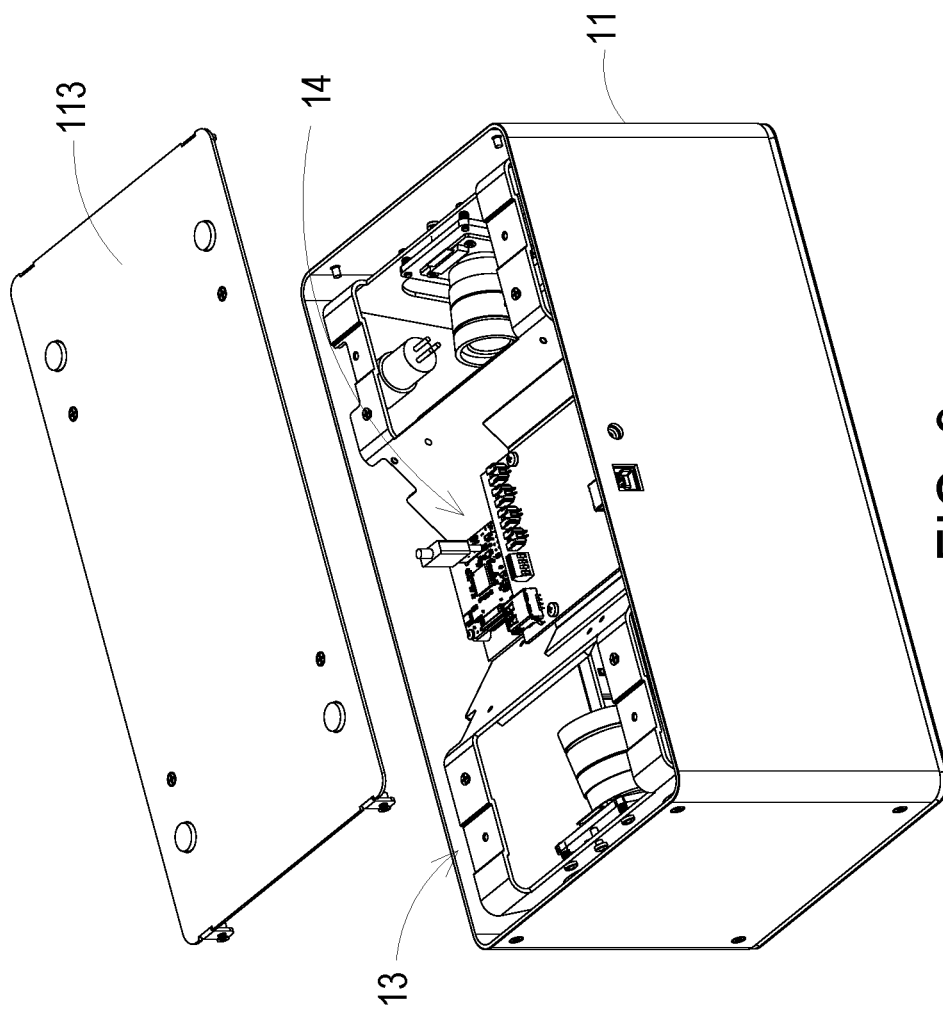
FIG. 9 is a schematic view illustrating a control module of the barcode reading device.

Please refer to FIG. 9, which is a schematic view illustrating the control module of the barcode reading device. The control module 14 is disposed under the second frame 131 to utilize the space under the W-liked shape second frame 131, which effectively prevents the increase of volume of the housing 11. Moreover, since the position thereof is close to a bottom plate 113 of the housing 11, it only needs to open the bottom plate 113 as maintaining or performing other operations, which is convenient no matter during assembling or post-assembly adjustment. Here, the control module 14 includes circuitries which are respectively used for controlling the barcode reading device 10 and for imaging and processing images, such as image processor, control circuit board and power source, but limited thereto.

In conclusion, in the present disclosure, the core reading elements of the barcode reading device are divided into the first modularized assembly and the second modularized assembly, wherein the first frame and the second frame are employed to define not only positional relationships among the elements in the first modularized assembly and the second modularized assembly, but also positions of the elements in the housing relative to the window, so that the conventional separated assembling operations are simplified into the modularized assembling operation, thereby achieving a more effective assembling procedure, improving the consistency, accuracy and efficiency of assembling, significantly saving the assembling time, and minimizing the impact of manual operation. In addition, through employing the adjustment mechanism, the fine-adjusting for each element after assembled also can be achieved easily and quickly.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A barcode reading device, comprising:
   a housing having a window for placing a barcode;
   a first modularized assembly disposed in the housing, comprising:
   at least one first light source illuminating the barcode;
   at least one second light source illuminating the barcode; and
   a first frame for disposing and positioning the at least one first light source and the at least one second light source; and
   a second modularized assembly disposed in the housing, comprising:
   at least one reflective optical element reflecting a light from the barcode;
   at least one imaging unit receiving an image of the barcode reflected by the at least one reflective optical element;
   a second frame comprising at least one third disposing portion and at least one fourth disposing portion for respectively disposing and positioning the at least one reflective optical element and the at least one imaging unit;
   at least one installation plate having the at least one imaging unit disposed thereon; and
   a plurality of supporting elements, a plurality of fastening elements and a plurality of elastic elements for disposing the at least one installation plate on the at least one fourth disposing portion, and for adjusting a positional relationship between the at least one installation plate and the at least one fourth disposing portion, thereby adjusting a pitch angle and/or a focal length of the at least one imaging unit,
   wherein positions of the at least one first light source, the at least one second light source, the at least one reflective optical element and the at least one imaging unit relative to the window are defined by positioning the first frame and the second frame in the housing.

2. The barcode reading device as claimed in claim 1, wherein the window is disposed on a top plate of the housing, the window, the first frame and the second frame are arranged in sequence from top to bottom, and the first frame and the second frame are mutually combined and positioned in the housing.

3. The barcode reading device as claimed in claim 1, wherein the first frame comprises at least one first disposing portion and at least one second disposing portion for respectively disposing the at least one first light source and the at least one second light source.

4. The barcode reading device as claimed in claim 3, wherein the first frame comprises a plurality of adjustment members disposed on the at least one first disposing portion and/or the at least one second disposing portion for adjusting a position of the at least one first light source and/or the at least one second light source.

5. The barcode reading device as claimed in claim 4, wherein the plurality of adjustment members comprise at least one slot, and the at least one first light source and/or the at least one second light source is moved along a longitudinal direction of the at least one slot.

6. The barcode reading device as claimed in claim 1, wherein the second frame comprises a plurality of positioning elements disposed on the at least one third disposing portion for positioning the at least one reflective optical element.

7. The barcode reading device as claimed in claim 1, further comprising a light shielding member disposed on the window for regulating a range of the window to dispose the barcode.

8. The barcode reading device as claimed in claim 1, wherein the window is disposed on a top plate of the housing, and the top plate comprises a first set of opposite sides and a second set of opposite sides, wherein a length of the first set of opposite sides is greater than a length of the second set of opposite sides.

9. The barcode reading device as claimed in claim 8, wherein the at least one first light source comprises two first LED arrays disposed respectively corresponding to the first set of opposite sides, and an optical surface of each of the two first LED arrays is faced toward the window and at an angle of 90 degree relative to a plane of the window.

10. The barcode reading device as claimed in claim 8, wherein the at least one second light source comprises two second LED arrays disposed respectively corresponding to the second set of opposite sides, and an optical surface of each of the two second LED arrays is faced toward the window and at an angle of 45 degree relative to a plane of the window.

11. The barcode reading device as claimed in claim 8, wherein the at least one first light source and the at least one second light source respectively have an angular distribution of 120 degree.

12. The barcode reading device as claimed in claim 8, wherein the at least one reflective optical element comprises two reflective mirrors disposed under the window and arranged adjacent to each other in a direction along the length of the first set of opposite sides, and a reflecting surface of each of the two reflective mirrors is respectively faced toward one of the second set of opposite sides adjacent thereto and at an acute angle relative to a plane of the window, and wherein the at least one imaging unit comprises two cameras respectively disposed between one of the two reflective mirrors and one of the second set of opposite sides adjacent to said one of the two reflective mirrors and facing toward the reflecting surface of said one of the two reflective mirrors.

13. The barcode reading device as claimed in claim 12, wherein a section of the second frame along an arranging direction of the at least one reflective optical element and the at least one imaging unit has a W-liked shape.

\* \* \* \* \*